United States Patent
Parent (10) Patent No.: US 7,130,852 B2
(45) Date of Patent: Oct. 31, 2006

(54) INTERNAL SECURITY SYSTEM FOR A RELATIONAL DATABASE SYSTEM

(75) Inventor: Patrice P. Parent, South Yarmouth, MA (US)

(73) Assignee: Silicon Valley Bank, Santa Clara, CA (US)

(*) Notice: Subject to any disclaimer, the term of this patent is extended or adjusted under 35 U.S.C. 154(b) by 651 days.

(21) Appl. No.: 09/916,427

(22) Filed: Jul. 27, 2001

(65) Prior Publication Data

US 2003/0023868 A1 Jan. 30, 2003

(51) Int. Cl.
*G06F 17/30* (2006.01)
*H04L 9/32* (2006.01)

(52) U.S. Cl. .............. 707/9; 707/2; 707/3; 707/4; 707/10; 707/101; 707/103; 707/104.1; 701/201; 713/189

(58) Field of Classification Search ............ 707/9, 707/2, 3, 4, 10, 101, 102, 104.1, 201; 713/200, 713/189, 193, 194
See application file for complete search history.

(56) References Cited

U.S. PATENT DOCUMENTS

| | | | |
|---|---|---|---|
| 5,560,005 A | * | 9/1996 | Hoover et al. ............. 707/10 |
| 5,787,428 A | | 7/1998 | Hart .......................... 707/9 |
| 5,911,143 A | * | 6/1999 | Deinhart et al. ........ 707/103 R |
| 6,012,067 A | * | 1/2000 | Sarkar ................... 707/103 R |
| 6,268,850 B1 | * | 7/2001 | Ng .......................... 715/866 |
| 6,275,824 B1 | * | 8/2001 | O'Flaherty et al. ............ 707/9 |
| 6,304,876 B1 | | 10/2001 | Isip, Jr. ................... 707/100 |
| 6,820,135 B1 | * | 11/2004 | Dingman et al. .......... 709/246 |

OTHER PUBLICATIONS

C.J.Date, An Introduction to Database Systems, May 2000, Addison Wesley, 7th Edition, p. 4.*
Craig Utley, Designing the Star Schema Database, Feb. 2, 2001, http://www.ciobriefings.com/whitepapers/StarSchema.asp, CIOBriefings White Ppers Pages, p. 1 and 6.*
Ramanathan Ram, Hierarchically-organized, mutihop mobile wireless networks for equality-of-service support, 1998, Mobile networks and application, pp. 101-119.*

* cited by examiner

*Primary Examiner*—Shahid Alam
*Assistant Examiner*—Fred Ehichioya
(74) *Attorney, Agent, or Firm*—Wilmer Cutler Pickering Hale and Dorr LLP (57) ABSTRACT

An internal security method for use with a relational database system is disclosed. The method is incorporated into a database system such that there is no need for security coding be layered on top of the system application software to prevent unauthorized access to restricted database information. The method of the present invention includes at least two embodiments and at least one of the embodiments has a "down the tree view" structure.

21 Claims, 5 Drawing Sheets

Figure 1

Prior Art

INTERNAL SECURITY SYSTEM FOR A RELATIONAL DATABASE SYSTEM

FIELD OF THE INVENTION

The present invention relates to relational database systems. More specifically, the present invention relates to database systems that have security systems or methods associated with them to prevent unauthorized access to certain database information.

BACKGROUND OF THE INVENTION

There are many multiple-user systems that are currently available for storing and retrieving information. Many of these are database systems that permit system users to obtain large amounts of information on an unrestricted basis. For example, such systems could be con-figured as shown generally at 100 in FIG. 1. This prior art system could have a "hub and spoke" configuration that could be appropriately embodied as a local area network ("LAN"), metropolitan area network ("MAN"), or a wide area network ("WAN").

Figure 1:
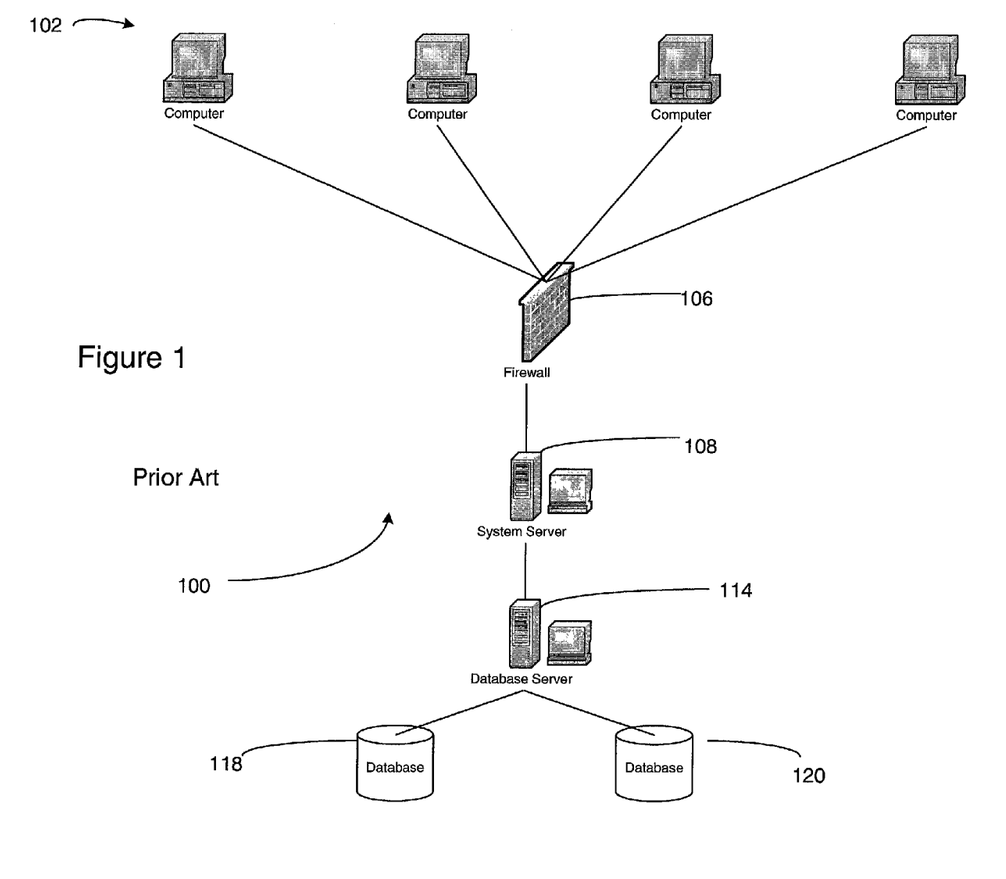
FIG. 1 is a general schematic diagram of a prior art relational database system that does not incorporate the present invention.

According to FIG. 1, the system may include 1 to N system users who interface with the central section of the system through personal computers 102. "N" is an integer greater that "1." The personal computers may be hardwired to the central section or they connect through a wireless connection. Moreover, personal computers 102 may be connected to the remainder of the system via the Internet or as part of an intranet.

A system user's personal computer may or may not contain the necessary application software for system operation. For example, the application software may reside at the personal computers or at system server 108.

The system designer will determine the most efficient and desirable transmission method for the 1 to N system users to communicate with the central section of the system given the circumstances surrounding system use, system user location, and user demographics. Through the selected communication method, each of the system users will be able to communicate with the system databases to input desired data information to, or retrieve desired data information from, the system databases.

Firewall 106 is shown in FIG. 1. Firewall 106 will pass system data information but will filter other information. Firewall 106 operates in a conventional manner.

Firewall 106 connects to system server 108. System server 108 also operates conventionally. System server 108 is object-oriented based and has a client-side and a server-side. The client-side objects are responsible for maintaining the system state and contains substantially all of operation rules for the system. The server-side objects are stateless and interact with the databases through database server 114. The main purpose of the server-side objects is to ensure transaction integrity.

System server 108 connects to database server 114. Database server 114 server may be a structured-query language ("SQL") server. There may be one or more SQL database servers associated with the system. The database server is used for accessing the various system databases. SQL database server 114 is associated with specific system databases, such as databases 118 and 120. These databases will store specific data information which may be retrieved if the system user submits the proper query. After the databases are created, system users may also add data information to, or delete data information from, these databases.

Databases 118 and 120 receive and store data information from the various system users or from the system administrator. The stored data information will usually be overlaid with a database management system (DBMS) that is resident in database server 114. The DBMS generally will include database applications. Typically, the DBMS is configured using four general types of data-structure classes. These are hierarchic, network, relational, and semantic data-structure classes. In particular, the relational data-structure class, with its association with DBMS, has evolved into what is now referred to as Relational Databases.

Relational databases are now viewed, in many cases, the standard for the design of both large and small databases. The simplest model of a database would consist of a single table which includes a number of fields for each record that is desired to be stored. If a relational database system is not used, it will be necessary to repeat a great deal of information within the database. This makes it very difficult to maintain the data and there may be resulting data errors based on inconsistent records. However, if a relational database system is used, activities in the database will be related through, e.g., a record. The database application software of a relational database system will manage groups of records that are related.

As an example, if there is a catalog-based sales system, information may be stored in three tables. The tables could be titled Name, Order, Items Ordered. Each of these tables, in turn, would have subsections of information. The subsections for the Name table could include the spelling of the name; the street address; city, state, and zip-code; and phone number. The Order table could have the subsections invoice number, date, and catalog number. Finally, the Items Ordered table could have the subsections catalog item number ordered, quantity, and price. If this information is handled by a relational database system, each of the Order table records will include a name identification (NID) field and the Items Ordered table records will include an order number field (ONB) field. These two new fields are foreign keys of the relational database and provide a serial link for the records of the database.

The creation of the database in the method just described alleviates the need to repeat the Name table data for each Order table record because you can rely on the serial linking, through the NID. Accordingly, if there is, for example, a change in the address associated with a particular name in the Name record, this change will be made for every order associated with that Name. This same process is applied to the second link, ONB.

As stated, database server 114 may be a SQL server. As such, the queries that are developed for relational databases 118 and 120 are in the Structured Query Language ("SQL"). Using SQL to develop a query, the query, in an unrestricted manner, could request the display of all of the orders placed by someone with a particular name. The Name and Orders tables are linked by a NID, and once this linking has taken place, the number of orders may be determined for a particular Name and displayed as desired.

A query in SQL, with regard to obtaining information from the three tables defined previously, would consist of a SELECT command follows by a FROM command. The SELECT command or keyword defines the desire to select records from the tables. This could be SELECT name; street address; city, state, and zip-code; order invoice number; and order date. The command or keyword that follows is FROM. The FROM command or keyword indicates from where the data comes. Accordingly, the FROM command or keyword in the previous example would indicate the data was coming from the Name table and the order table. The FROM command will be associated with the appropriate JOIN command which will provide the proper connection of the data from the two tables.

The decision must be made as to how to maintain the integrity of the database files when there are deletions. If cascading is the desired method, if there is a change in the NID in the Name table, then there would be a change in the related records in the Order table. The second choice is that deletions will not be permitted if there are related records. In this case, if there is a deletion of a NID and there are related records in the Order table, the deletion of the NID will not be permitted until there related records are deleted or are no longer related to the NID being deleted.

Tables are to represent things in the real world. In a particular database, the row of a table is to be unique. Each of the columns represent a specific field for each row. This is carried out by each table having a primary key which is usually a column of the table having unique values for the table. Each table will have only one primary key. Together all of the columns of the table with unique values are candidate keys from which the primary key is selected. The other columns are alternate keys. A simple key is made up of one column where a composite key is made up of two or more columns. The easiest way to choose the primary key is to select one column if you can.

The main use of primary keys is for creating relationships between multiple tables in a database. This concept involves the use of foreign keys mentioned briefly above. A foreign key in a table references a primary key in another table. This joining relationship is the basis of relational database theory. For example, the primary key in a first table would be a foreign key in a second table. These table-to-table relationships may continue infinitely if desired. They may be on an one-to-one relationship, an one-to-many relationship, or a many-to-many relationship, which in reality is multiple one-to-many relationships.

The efficiency of the database tables is accomplished by normalization to remove redundancies from the tables. The three general normalization forms are the First, Second, and Third Norm Forms. The First Norm Form is that for every row-by-column position in a particular table, there is only one value. The Second Norm Form is that every non-primary key column is dependent on the primary key. And, the Third Norm Form is that all of the non-primary key columns are independent of one another. There are higher Norm Forms that solve certain specific inadequacies in the first three, but principally normalization is satisfied by satisfying the First, Second, and Third Norm Forms.

The integrity rules are of two types: General and Database-Specific. The General Integrity rules may be either Entity Integrity or Referential Integrity. The Entity Integrity rule is that the primary keys cannot have missing data. The Referential Integrity rule is that a database must not contain any unmatched foreign key values. In following these rules, if a referenced primary key changes or a row is deleted, the system may take one of three options. First and second it may cascade or prevent the change, as described before. Third, for deletions, the system may set all of the foreign keys values associated with the deletion to zero or null.

Database-Specific Integrity rules are ones that are specific to a particular database. These are ones that the database creator develops for enhancing his/her database and especially database management.

SQL was discussed briefly above as a query language for relational databases. It is particularly useful to create and manipulate relational databases. The SQL commands are divided into two groups. These are Data Definition language ("DDL") and Data Manipulation Language ("DML"). DDL includes the commands that are used to create and delete databases and databases objects. On the other hand, DML is used to insert, retrieve, and modify data once a database is defined with DDL.

The four basic commands of DDL are CREATE, USE, ALTER, and DROP. CREATE is a command used to establish a database in a system. The CREATE command may also be used to create tables in a database. USE is a command that is used to specify the database that is desired to work within the system. ALTER is a command that is used once a table is created to modify the definitions of it. That is, changes to the structure of the table may be made without deleting and recreating it. DROP is a command that is used to remove entire database structures from a database.

DML, as stated, is used to retrieve, insert, and modify database information. The DML commands INSERT, SELECT, UPDATE and DELETE are used during routine operations of the database. INSERT is a command that is used to add records to an existing table. As an example, INSERT could be used to add new rows to the existing table. SELECT is a command that is used to retrieve specific information from an operational database. It may be tailored narrowly or broadly. UPDATE is a command that is used to modify information contained in and existing table. This may be done for an individual cell or for more than one cell of values. DELETE is a command that is used to remove a record from an existing table.

There are times when the data information that is stored in the databases is not intended to be accessible by all system users, which may be for a number of reasons. For example, the data information could be of a sensitive nature or it simply may not pertain to the activities of a particular system user. Whatever the reason, there is a basis for permitting certain system users access to specific information while, at the same time, denying certain other system users access to this same data information.

This problem has been addressed by providing system users access to the restricted data information using external security coding. The best known and most used method of such coding is the use of passwords. The password concept has been expanded in situations relating to the access to very sensitive data information. In these cases, recognition systems have been used the evaluate certain unique physical attributes of the system user seeking access, such as voice, fingerprints, and retina scans, before access is granted. The problem also has been addressed by requiring the system user seeking access to answer a series of questions that allegedly only the system user having the proper authorization should know the answer.

This conventional way to incorporate levels of security into the system such as is shown in FIG. 1, generally at 100, may be cured out by externally layering security coding at system server 108. This security coding will require the system user to present the proper information before he/she will be granted access to the restricted data information. The problem with this type of security is that it always leaves open the possibility that a cleaver computer programmer or "hacker," given enough time, will be able to find a "back door" to gain unauthorized access to the restricted data information that is stored in the system databases.

There have been attempts to defeat the ability of hackers to breach system security when such a system has a potential "back door." One method has been to change the access codes on a scheduled basis. This entailed changing the access code after very short periods of time, such as every day, every week, or every 12 hours. This scheme was believed effective because it allegedly would not give the "hacker" with enough time to be able to obtain the correct access code before it is changed to a new access code. However, these systems have been compromised.

Another method has been to use random number of generators that change the access code every minute. In these systems, the system user and the system would have matched random number generator systems that use the same algorithm. Again unless they matched, access would be denied. The problem with these methods is that the "back door" still exists and those who are authorized access to the restricted data information must always coordinate with the system server to ensure he/she is able to present the correct access codes. In a large commercial company, this solution can result in a nightmare for those who are authorized access to restricted data information because they may not always have the appropriate access codes at their fingertips or the "hackers" figure the access code generating algorithm.

The present invention overcomes these problems as will be set forth in the remainder of this specification and claims, and referring to the drawings.

SUMMARY OF THE INVENTION

The present invention is an internal security method that may be used in hierarchical database system to prevent unauthorized access to restricted data information that is stored in the system databases. The method of the present invention is incorporated into a database system in such a way that there is no need for security coding to be layered on top of the system application software to prevent unauthorized access to the restricted database information.

The method of the present invention is incorporated at the database server when the database is structured for the system users and not at the system server where it is normally layered on the system application software. More specifically, the method of the present invention is implemented at the creation of the database structure in the form of views that will be available to a particular individual who is a system user. These views are constructed so that each system user will have available for retrieval only those records that are deemed to be accessible by him/her.

Restricted access to database information according to the method of the present invention may based on criteria that is determined by the system owner, developer, or system administrator. For example, access may be controlled by the geographic location, employment position, need to know, or other objective or subjection criteria.

The method of the present invention may be implemented using SQL. As such, the two groups of SQL commands may be used to create and maintain the prefer access for system used, are the DDL ("Data Definition language") group and the DML ("Data Manipulation Language") group. The DDL commands are CREATE, USE, ALTER, and DROP; and the DML commands are INSERT, SELECT, UPDATE and DELETE. These basic commands along with CONSTRAINTS, JOIN, FROM, WHERE, and NULL are used to operate the relational database system to provide security and in such a security system there is no "back door" that will be available for gaining unauthorized access to the restricted information stored in the system databases.

The system incorporating the security method of the present invention will include a plurality of system users who have access to the system databases. The system users may interact with the remainder of the system through input/display devices such as personal computers. The personal computers may be connected to the remainder of the system in various ways.

The system server, which is at a central section of the system, will receive requests and queries from the system users for the storage and retrieval of data information from the system databases. The system server contains the system application software. The system server will also be the element of the central section that transmits data information to the personal computers of the system users.

The system server communicates with the database server. The database server contains the database application software. The database server is configured so that, when desired, the internal security method of the present invention may be employed in the relational database. The database is structured to provide, on an individual system user basis, access to specific restricted database information that is tailored for that system user. This security method also may be tailored so that multiple system users may access to particular data information that is stored in the system databases; however, one system user's access to particular data information will not permit that system user to be able access other information of another system user who also has access to that particular piece of restricted data information.

The security system of the present invention provides for layered levels of security that will permit hierarchical viewing of restricted data information that is made available to system users. However, this view construct will permit viewing the data information down a particular tree structure to the branches but will not permit the viewing of data information up the structure. Moreover, even though system users share data information down the tree structure, there still is not a way by which a computer "hacker" can find a "back door" through which to gain general access to the data information to which he/she is not authorized to receive.

An object of the present invention is to provide an internal security system that may be implemented through a relational database system.

Another object of the present invention is to provide an internal security system that may be implemented through a relational database system that will not provide a "back door" for computer "hackers" to gain unauthorized access to restricted data information stored in the system databases.

A further object of the present invention is to provide an internal security system that may implemented through a relational database system that will not provide general access to the restricted data information stored in the system databases if unauthorized access is gained through one or more system users.

A yet further object of the present invention is to provide an internal security system that may be implemented through a relational database system and the internal security system may have multiple levels of security with each of these multiple levels having different access rights to the restricted data information that is stored in the system databases.

Another object of the present invention is to provide an internal security system that may be implemented through a relational database system in which each of the system users will have a defined view of the restricted data information that is stored in the system databases.

A further object of the present invention is to provide an internal security system that may be implemented through a relational database system in which system users with higher security access levels may be permitted access to restricted data information of system users with lower security access levels.

A yet further object of the present invention is to provide an internal security system that may be implemented through a relational database system in which system users with higher security access levels may not be permitted access to system users with lower security access levels.

These and other object will be disclosed in greater detail in the remainder of the specification, the attached figures, and in view of the appended set of claims directed to the present invention.

DETAILED DESCRIPTION OF THE DRAWINGS

The present invention is an internal security method that may be used in hierarchical database system. The method of the present invention prevents unauthorized access to restricted data information that is stored in the system databases. This method may be implemented in the relational database system in such a way that the need for security coding to be layered on top of the system application software is eliminated yet unauthorized access to restricted data information is still prevented.

Figure 2:
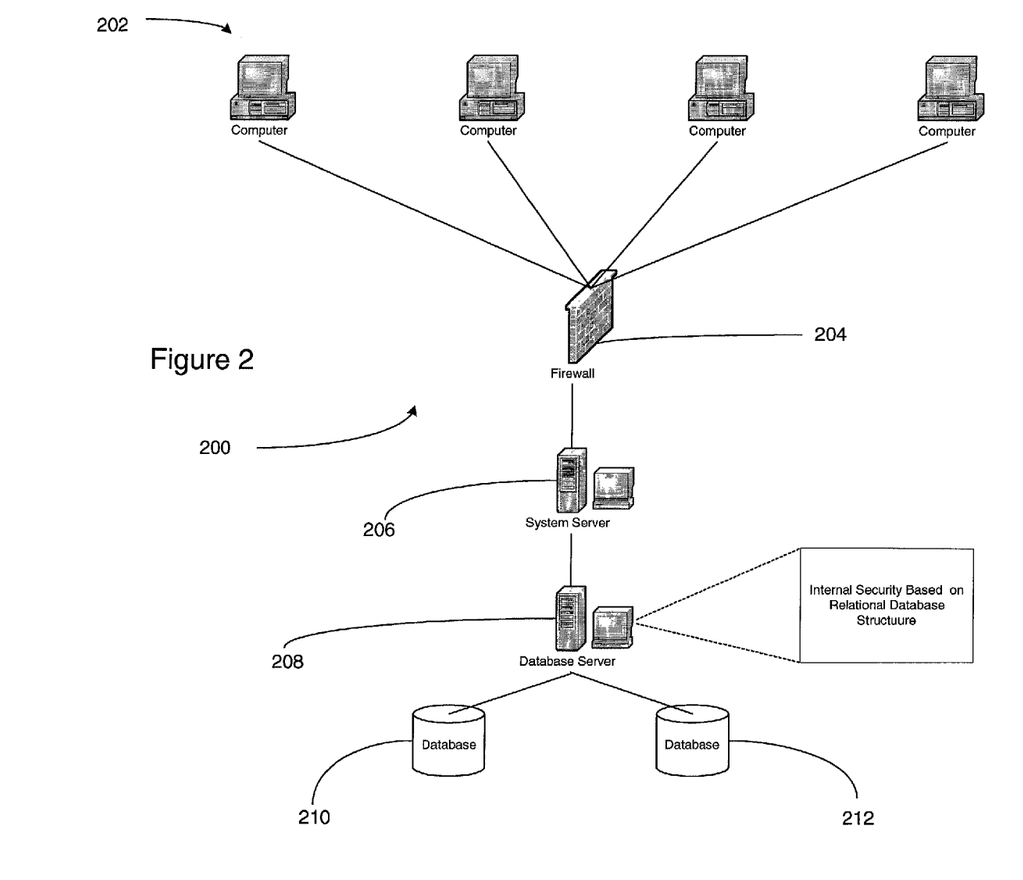
FIG. 2 is a general schematic diagram of a conventional relational database system that incorporates the present invention.

FIG. 2 is a conventional relational database system that incorporates the security method of the present invention. Reference to a relational database system in the context of the present invention means a database system in which the data information is represented by values in tables, the records in the tables are accessible by specifying a table name, a column name, a primary key, and a foreign key, NULL values are processed, there is a character based language that can be used to modify the structure and content of the database, there are integrity constraints, and the database is managed using relational tools.

Referring to FIG. 2, generally at 200, a relational database system is shown that incorporates the method of the present invention. The system users interface with the relational database system through 1 to N input/display devices 202, where N is an integer greater than 1. The input/display devices may by intelligent or semi-intelligent devices. These devices, for example, may be workstations or personal computers. Preferably, the input/display devices are personal computers. For purposes of the security method of the present invention, it is only necessary that the personal computers be capable of communicating with the central section of the relational database system for inputting or retrieving data information, and formatting the queries to perform these functions.

Figure 3:
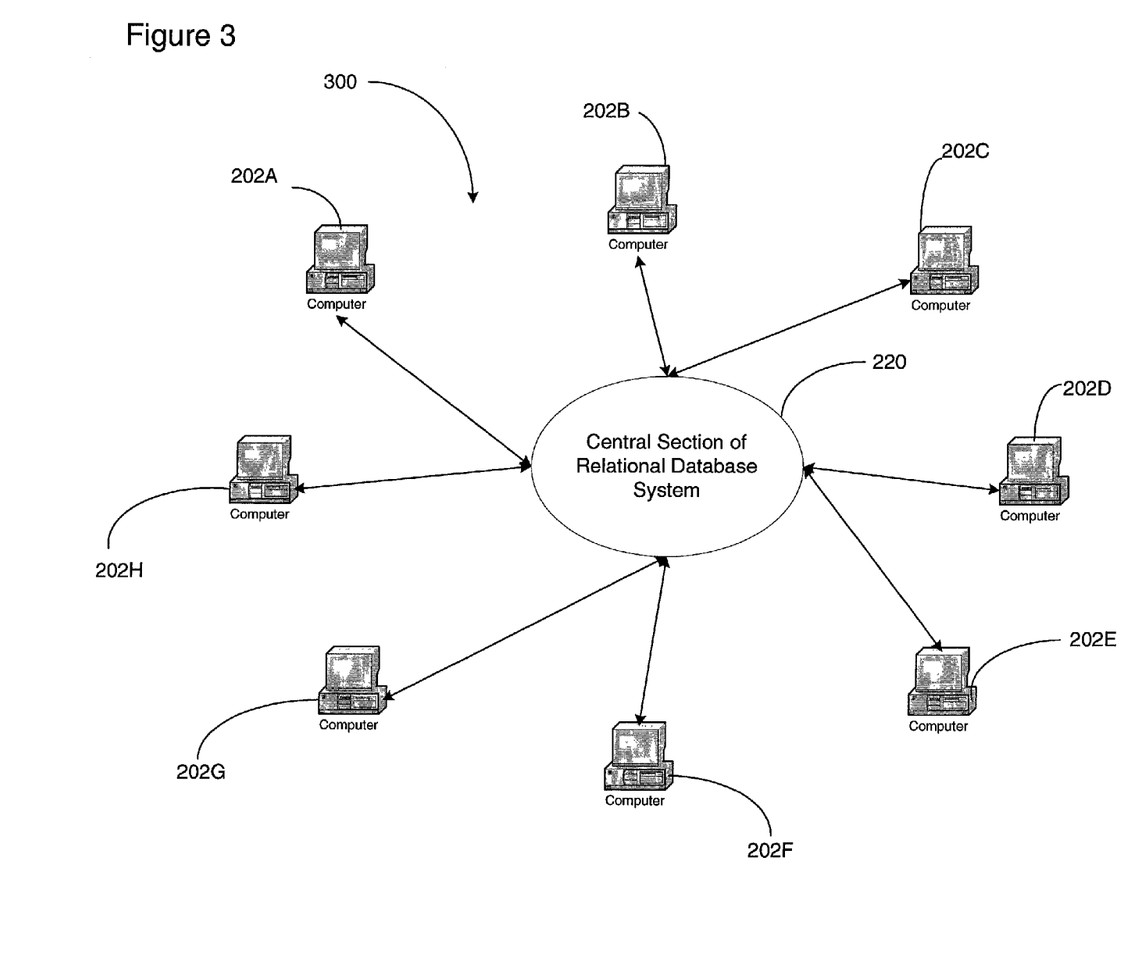
FIG. 3 is a representative relational database system structure for carrying out the method of the present invention.

The preferred configuration of the database system that incorporates the security method of the present invention is a star schema such as shown in FIG. 3. Referring to FIG. 3, generally at 300, a full star schema is shown. The central section of the full star schema at 220 is titled "Central Section of Relational Database System." Central section 220 will include firewall 204, system server 206, database server 208, and representative databases 210 and 212. Clustered around central section 220 are 1 to N personal computers 202. In FIG. 3, N=8, so, in this Figure, there are personal computers 202A to 202H. Each of the personal computers is bi-directionally connected to central section 220.

Returning to FIG. 2, personal computers 202 connect to firewall 204. Firewall 204 is conventional and will pass data information that is properly for the database system or is to be transmitted from the central section to one or more system users. The connection between personal computers 202 and firewall 204 may be hardwire or wireless connections or some of each.

Firewall 204 is connected to system server 206. System server 206 will include the system application software for the general operation of the system. System server 206 also is conventional.

The system includes database server 208 that connects to system server 206. The database server preferably is a relational database server. The database server uses a structuredquery language ("SQL"). The database server also may have a computer terminal associated with it.

FIG. 2 shows databases 210 and 212. These databases are meant to be representative of databases that may be used with the system incorporating the method of the present invention. Accordingly, the system that employs the method of the present invention may include more or less that two databases and still be within the scope of the present invention.

Given the structure of the representative relational database system in FIG. 2 that employs the method of the present invention, the operation of the method of the present invention will be described. However, before discussing the embodiments of the present invention, the general corporate organizational structure that is shown in FIG. 4 will be discussed and this structure will be used in disclosing the method of the present invention.

Figure 4:
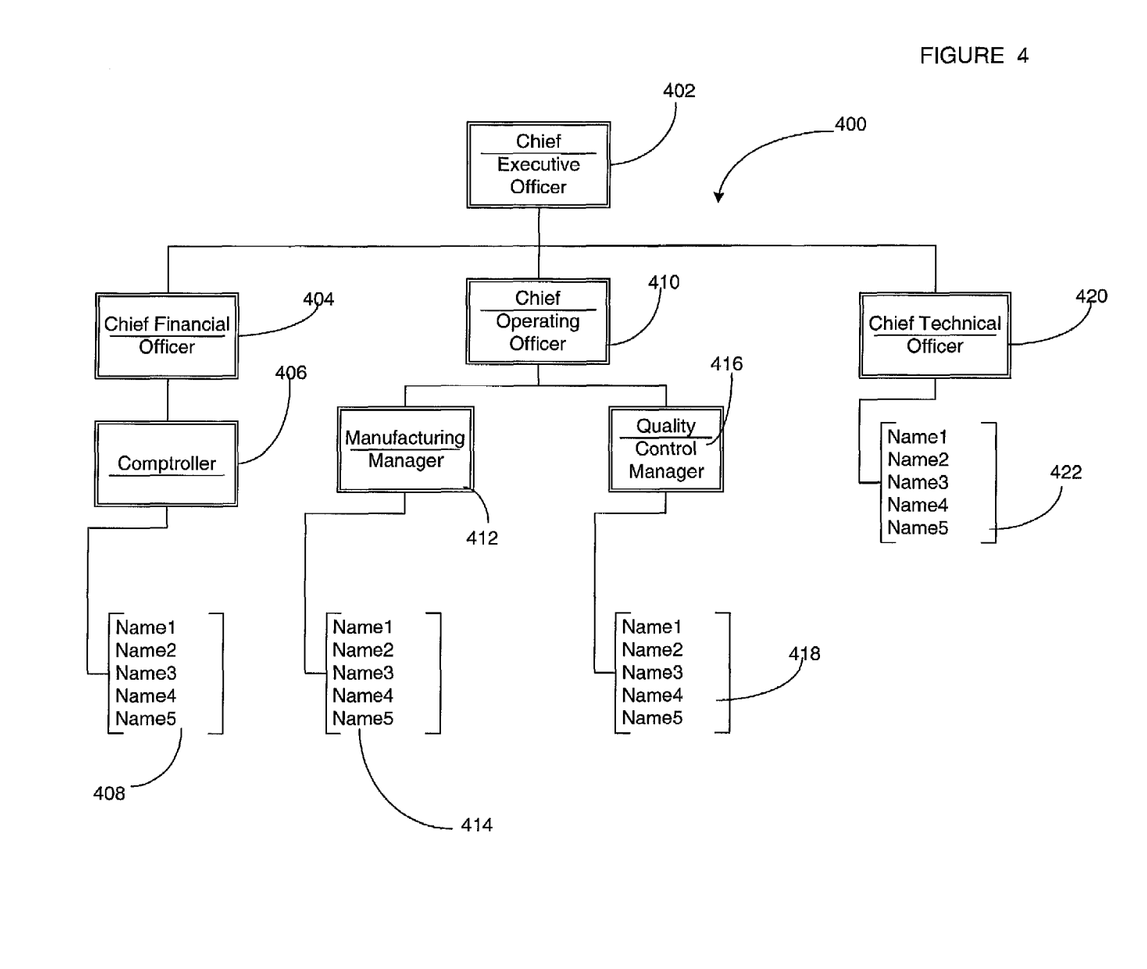
FIG. 4 is a representative organizational structure that may be used for carrying out the method of the present invention.

Referring to FIG. 4, a representative organizational chart for a company is shown generally at 400. In FIG. 4, the Chief Executive Officer ("CEO") is shown at 402. The next level of executive management is the Vice Presidents. These are the Chief Financial Officer ("CFO") at 404, the Chief Operating Officer ("COO") at 410, and the Chief Technology Officer ("CTO") at 420.

The financial organization under the CFO will include the Comptroller at 406 and the remainder of the organization which is shown at 408. The Operations organization is headed by the COO at 410 and includes the Manufacturing section and the Marketing section. The Manufacturing Manager at 412 reports to the COO and the remainder of the manufacturing staff at 414 report to the Manufacturing Manager. In a similar fashion, the Marketing Manager at 416 reports to the COO and the remainder of the marketing staff at 418 report to the Marketing Manager. The final corporate section is the technology section that is headed by the CTO at 420. The CTO has a staff at 422 who report to him.

If a company with an organization structure such as that shown in FIG. 4 was to employ a database system like that shown in FIGS. 2 and 3, each one of the individuals in the positions shown, including the staff position, will have a personal computer for accessing the system databases to perform their jobs. This will also mean that each individual will have access to the company's database files which will contain various types of data information. Some of this data information is of a general nature and accessable by all company employees. Another category of information that is in the system databases is data information that is job related. For example, there may be information stored in the system databases that is pertinent to the financial organization but not to the marketing organization. A further distinction in the information that is stored in the system databases is that there may be certain information that is of a confidential or proprietary nature.

Even given these three broad categories of data information that may be stored in the system databases, it is clear that it would be appropriate for there to be restrictions on access to the certain information. These restrictions may be based on an individual's position in the company, the particular project to which an individual is assigned, or it could even be based on an individual's working relationship with other employees. Therefore, the need for controlled access to certain information stored in the system databases is very important to the company.

A first embodiment of the method of the present invention will be described in view of FIG. 5. The description of the first embodiment of the method of the present invention will be set forth as it relates to access to restricted data information that may be provided for the CFO (at 404 in FIG. 4).

Figure 5:
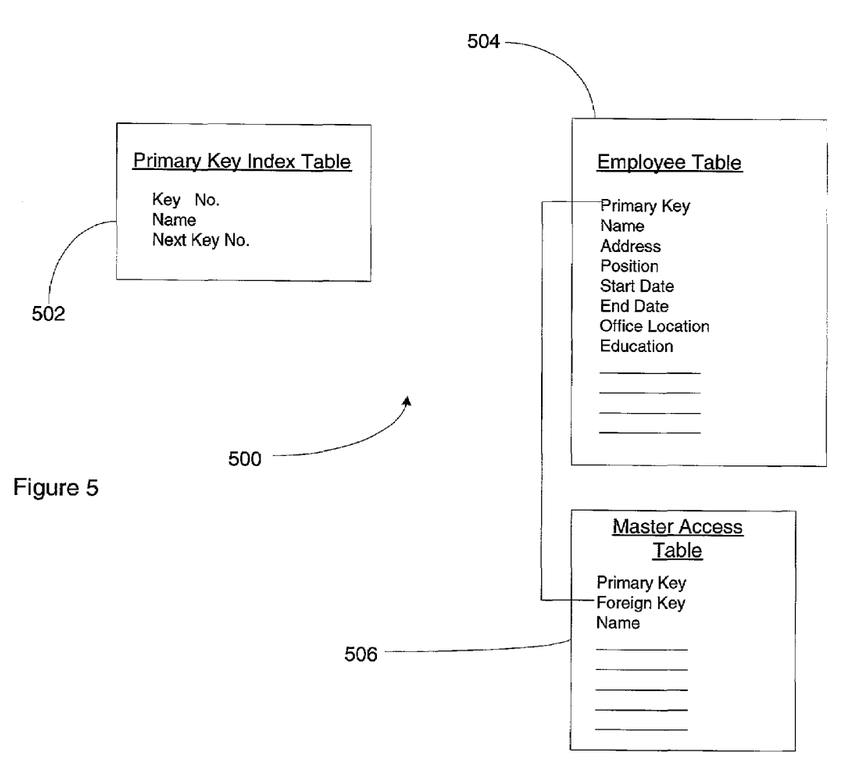
FIG. 5 shows representative tables for carrying out the method of the present invention.

Referring to FIG. 5, use of the primary keys is tracked by Primary Key Index Table 502. Through Table 502, assignments of primary key values are made only once. The primary keys that are assigned via Table 502 will be a foreign key in other Tables. Fields of the Primary Key Index Table are the Key No. field, which is an integer value, the Name field for the name of the Primary Key, which may up to a predetermined maximum number of characters, and the third field is the Next Primary Key field, which is an integer value and indicates the next available value for use as a primary key.

One of the items that will have a Primary Key value assigned to it will be each employee. Therefore, when a new employee, even the CFO, joins the company, the company begins a record for that employee. An example of an Employee Table is shown at 504. Employee Table 504 will include a number of fields. The first field is the Primary Key field which will include the Primary Key value that was assigned by Primary Key Index Table 502. The second field is the Name field that also is from Primary Key Index Table 502. This will be represented by a predetermined maximum number of characters. The remainder of the fields include information that the company desires to maintain for each employee. Some may be integer values, while other will be characters.

Again referring to FIG. 5, preferably, each individual in the company will have his/her restricted access to restricted data information controlled by a Master Access Table such as the one shown at 506. However, it is within the scope of the present invention that each individual (system user) of the company will have his/her own restricted access table.

Master Access Table 506 will have a number of fields. The first field will be the Primary Key for the Master Access Table that may be used as the foreign key for downstream related tables. The second field is the Foreign Key field which relates back to the appropriate Primary Key of Employee Table 504. The remainder of the fields will include information about the restricted materials that will be contained in each record of Master Access Table 506, which will include the record(s) pertaining to the CFO's access to restricted data information. These records may be increased or decreased by the system administrator based on directives from the appropriate authorities within the company. Each change of this type will change the system user's access level.

In the simplest form according to the first embodiment, the fields will contain appropriate scripts which will permit the CFO access to restricted data information that is stored in the system databases. For example, the restricted information that he/she may access may include the company's tax information, the company's cash position, the company's profit and loss for the year, or the compensation information for each individual of the company.

The CFO, in using the database system of the present invention, would use it as normal and he/she would have the ability to retrieve information of a general nature in the carrying out his/her duties and responsibilities. However, if there should come a time when the CFO is interested in preparing, for example, a confidential report on the company's financial position for the Board of Directors, he/she could also access restricted data information from the system databases based on access controlled by his/her records in Master Access Table 506.

The CFO, when he/she was appointed to the position, was given access to data information stored in the system databases, which includes certain restricted data information. The restricted data information to which he/she has access is based on a generic "view" controlled by Master Access Table 506. This view filters the restricted data information that the CFO can access according to the CFO's record(s) in Master Access Table 506. Although the CFO is high within the management of the company, his/her access is defined by, and confined to, this view. To expand access, that is, to increase the restricted data information given to a system user, new records must be created (in the context of the view) in Master Access Table 506.

Noting the foregoing, Master Access Table 506 will not permit the CFO to have access to other restricted data information outside his/her view that is stored in the system databases. Moreover, the internal security method of the present invention provides no "back door" by which an unauthorized user of the system may gain access even if given enough time in which he/she could normally hack into a system. Further, even if for some reason the CFO compromises his/her access to the database system or it is compromised by some other means, the entity who now has access based on the CFO's access would only have the CFO's views available for unauthorized entry and nothing else. If the CFO's access is compromised and the CFO learns of it, the CFO can contact the system administrator who can readily delete his/her records from the Master Access Table which would remove any access to the CFO's restricted data information thus ending the unauthorized access.

The second embodiment of the method of the present invention involves a "look down structure." In this embodiment of the method of the present invention, the security method permits, in some cases, the ability of system users with high access levels to look at the restricted data information of system users that have lower access levels.

Again referring to FIG. 4, the organization chart for the company is shown generally at 400. It is seen from the organizational chart that under the Operations organization the COO at 410 reports to the CEO at 402, the Manufacturing Manager at 412 reports to the COO, and the remainder of the manufacturing staff report to the Manufacturing Manager. According to the second embodiment of the method of the present invention, the COO at 410 will have COO Access Tables similar to Master Access Table 506 that is shown in FIG. 5. The COO generally will have a higher access than the individuals who directly or indirectly report to him, for example, in manufacturing section, which in this case would be the Manufacturing Manager at 412 and the remainder of the organization at 414.

The view that the COO would have through the COO Access Table(s) would be the data information that is designated for him/her that is independent of any of the individuals below him in the organizational chart. Next, the COO would have access to all of the restricted data information to which the Manufacturing Manager will have access. Further, the COO will have access to all of the restricted data information to which each of the remaining individuals at 414 will have access.

The COO's access to the restricted data information of the Manufacturing Manager and the remainder of the manufacturing section is through a series of JOINs. These JOINs are used when the COO Access Table(s) is created to provide a "down the tree view" of the restricted data information. This is also true for the restricted data information of the Manufacturing Manager. When the Manufacturing Manager Access Table(s) is created, it will have JOINs that will provide a "down the tree view" of the restricted data information to which the remainder of the manufacturing section will have been given access.

In looking at the organizational chart, it is noted that COO has two other executives at his level. These are the CFO and CTO. However, if the COO is granted access to certain restricted data information that is stored in the system databases, it does not mean that his/her organization level equivalents will have access to such information unless it is in that other executive's access table. Further, even if two executives of the company each have access to particular piece of restricted data information that is stored in the system databases, it does not result in either of these system users being able to access the restricted data information of the other executive because of the sharing of a particular piece of restricted data information.

Previously, reference was made to the second embodiment of the present invention being a "down the tree view" method. That is, through the use of JOINs, the COO and Manufacture Manager will have views in the company organization below them. However, there is no reciprocal view going the other way. As such, system security is maintained. Since there is no way to enter the system by "hacking," there are no lapses in security regarding unauthorized entering in the restricted data information of the company.

Although, the second embodiment has been described with COO, the Marketing Manager, and others having individual access tables, however, it is within the scope of the % present invention that Master Access Table(s) may be used to control access for all of the individuals.

The terms and expressions that are employed herein are terms or description and not of limitation. There is no intention in the use of such terms and expressions of excluding the equivalents of the feature shown or described, or portions thereof, it being recognized that various modifications are possible within the scope of the invention as claimed.

The invention claimed is:

1. A internal security method for a relational database system, comprising the steps of:
  (a) determining which data information from the total amount of data information stored in system databases is restricted data information that shall not be accessible by each and every 1 to N system users, where N is an integer greater than 1;
  (b) determining for each system user the restricted data information that such a system user shall have access;
  (c) determining the hierarchical level of access for each system user with regard to the restricted data information;
  (d) determining for at least two system users, based on the hierarchical level of access determination at step (c), that a second system user with a lower hierarchical level of access has access to the restricted data information that is a subset of the restricted data information to which a first system user with a higher hierarchical level of access has access;
  (e) creating at least one relational access table with each of the first and second system users having at least one record in the relational access table and using a foreign key in the table created at step (e) that is linked to a primary key associated with each of the first and second system user's table of the relational database system for controlling each of the first and second system users' respective downstream access to restricted data information that is determined at step (b) and preventing the first and second system users' respective downstream and upstream access to unauthorized restricted data information through the use of a foreign key and primary key link such that the first system user will have one or more records in the relational access table that will permit the first system user's access to restricted data information that is determined for the first system user at step (b) to be joined with the second system user's access to restricted data information that is determined for the second system user at step (b), and the second system user will have one or more records in the relational access table will permit the second system user's access to restricted data information that is determined for the second system user at step (b); and
  (f) the first and second system users accessing restricted data information stored in the system databases according to the relational access table created at step (e).

2. The method as recited in claim 1, wherein the relational database is a structured query language database.

3. The method as recited in claim 1, wherein each relational access table has a foreign key that relates to a primary key of only one system user.

4. The method as recited in claim 1, wherein each relational access table created at steps (e) and (f) may have access to additional restricted data information added to them by updating the relational access table after they are created.

5. The method as recited in claim 1, wherein each relational access table created at steps (e) and (f) may have access to certain restricted data information deleted from them by updating the relational access table after they are created.

6. The method as recited in claim 1, wherein the relational database system that incorporates the internal security method includes a star schema configuration.

7. The method as recited in claim 6, wherein the relational database system that incorporates the internal security method includes a full star schema configuration.

8. A internal security method for a relational database system, comprising the steps of:
  (a) determining which data information from the total amount of data information stored in system databases is restricted data information that shall not be accessible by each and every 1 to N system users, where N is an integer greater than 1;

(b) determining for each system user the restricted data information that such a system user shall have access;

(c) determining the hierarchical level of access for each system user with regard to the restricted data information;

(d) determining for at least two system users, based on the hierarchical level of access determination at step (c), that a second system user with a lower hierarchical level of access has access to the restricted data information that includes other than a subset of the restricted data information to which a first system user with a higher hierarchical level of access has access;

(e) creating at least one relational access table with each of the first and second system users having at least one record in the relational access table and using a foreign key in the table created at step (e) that is linked to a primary key associated with each of the first and second system user's table of the relational database system for controlling each of the first and second system users'respective downstream access to restricted data information that is determined at step (b) and preventing respective downstream and upstream access to unauthorized restricted data information through the use of a foreign key and primary key link such that the first system user will have one or more records in the relational access table that will permit the first system user's access to restricted data information that is determined for the first system user at step (b) to be joined with the second system user's access to restricted data information that is determined for the second system user at step (b), and the second system user will have one or more records in the relational access table will permit the second system user's access to restricted data information that is determined for the second system user at step (b); and (f) the first and second system users accessing restricted data information stored in the system databases according to the relational access table created at steps (e).

9. The method as recited in claim 8, wherein the relational database is a structured query language database.

10. The method as recited in claim 8, wherein each relational access table has a foreign key that relates to a primary key of only one system user.

11. The method as recited in claim 8, wherein each relational access table created at steps (e) and (f) may have access to additional restricted data information added them by updating the relational access table after they are created.

12. The method as recited in claim 8, wherein each relational access table crated at steps (e) and (f) may have access to certain restricted data information deleted from them by updating the relational access table after they are created.

13. The method as recited in claim 8, wherein the relational database system that incorporates the internal security method includes a star schema configuration.

14. The method as recited in claim 13, wherein the relational database system that incorporates the internal security method includes a full star schema configuration.

15. A internal security method for a relational database system, comprising the steps of:

(a) determining which data information from the total amount of data information stored in system databases is restricted data information that shall not be accessible by each and every 1 to N system users, where N is an integer greater than 1;

(b) determining for each system user the restricted data information that such a system user shall have access;

(c) determining the hierarchical level of access for each system user with regard to the restricted data information;

(d) determining for at least two system users, based on the hierarchical level of access determination at step (c), that a second system user with a lower hierarchical level of access has access to the restricted data information that is a subset and includes other than a subset of the restricted data information to which a first system user with a higher hierarchical level of access has access;

(e) creating at least one relational access table with each of the first and second system users having at least one record in the relational access table and using a foreign key in the table created at step (e) that is linked to a primary key associated with each of the first and second system user's table of the relational database system for controlling each of the first and second system users 'respective downstream access to restricted data information that is determined at step (b) and preventing respective downstream and upstream access to unauthorized restricted data information through the use of a foreign key and primary key link such that the first system user will have one or more records in the relational access table that will permit the first system user's access to restricted data information that is determined for the first system user at step (b) to be joined with the second system user's access to restricted data information that is determined for the second system user at step (b), and the second system user will have one or more records in the relational access table will permit the second system user's access to restricted data information that is determined for the second system user at step (b); and (f) the first and second system users accessing restricted data information stored in the system databases according to the relational access table created at steps (e).

16. The method as recited in claim 15, wherein the relational database is a structured query language database.

17. The method as recited in claim 15, wherein each relational access table has a foreign key that relates to a primary key of only one system user.

18. The method as recited in claim 15, wherein each relational access table created at steps (e) and (f) may have access to additional restricted data information added to them by updating the relational access table after they are created.

19. The method as recited in claim 15, wherein each relational access table created at steps (e) and (f) may have access to certain restricted data information deleted from them by updating the relational access table after they are created.

20. The method as recited in claim 15, wherein the relational database system that incorporates the internal security method includes a star schema configuration.

21. The method as recited in claim 20, wherein the relational database system that incorporates the internal security method includes a full star schema configuration.

* * * * *